Nov. 10, 1959 — O. BRUMMER — 2,912,265
FREE FLOATING DOUBLE END ANNULAR SEAL
Filed Jan. 23, 1957 — 2 Sheets-Sheet 1
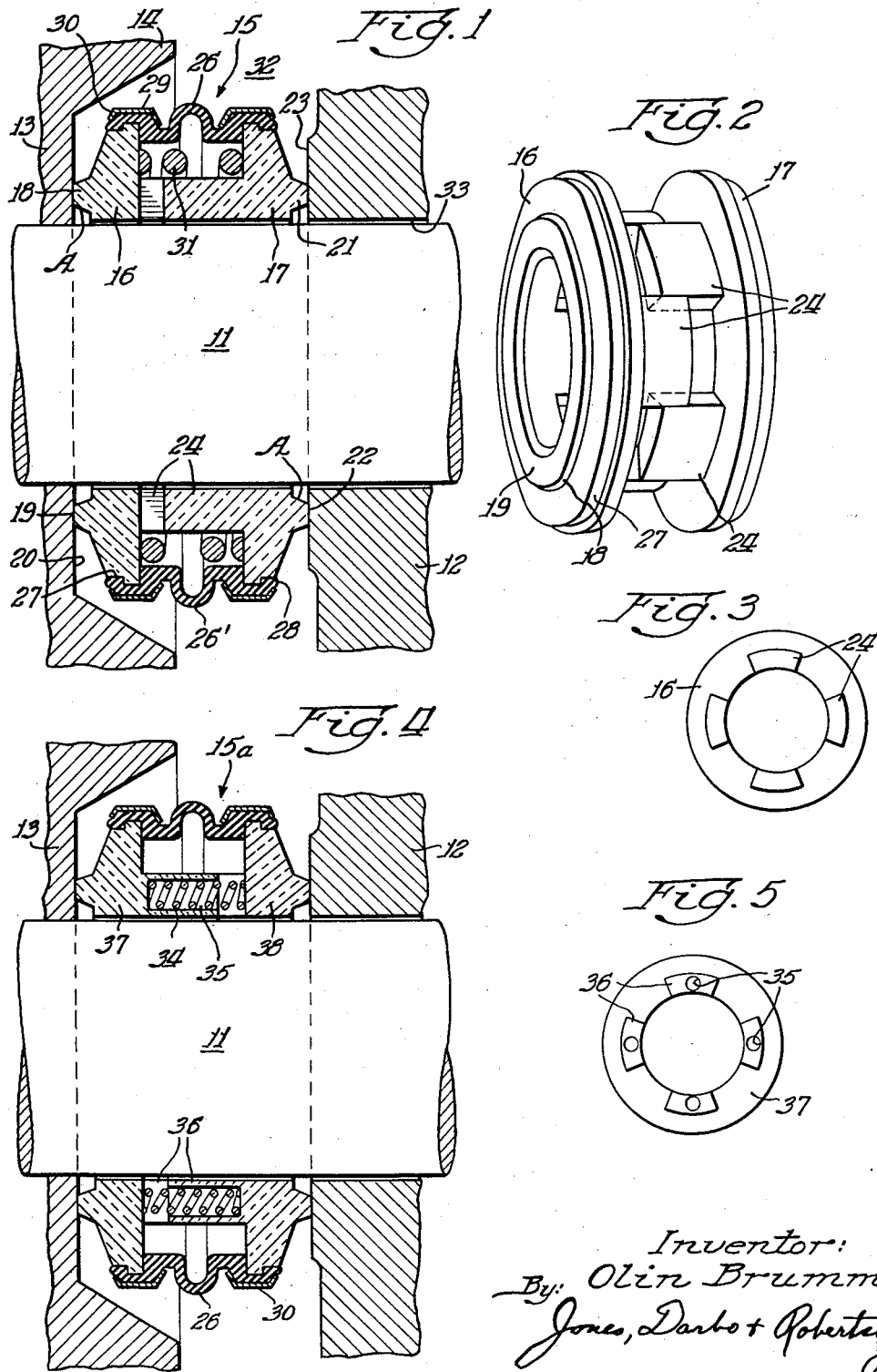

Nov. 10, 1959 — O. BRUMMER — 2,912,265
FREE FLOATING DOUBLE END ANNULAR SEAL
Filed Jan. 23, 1957 — 2 Sheets-Sheet 2
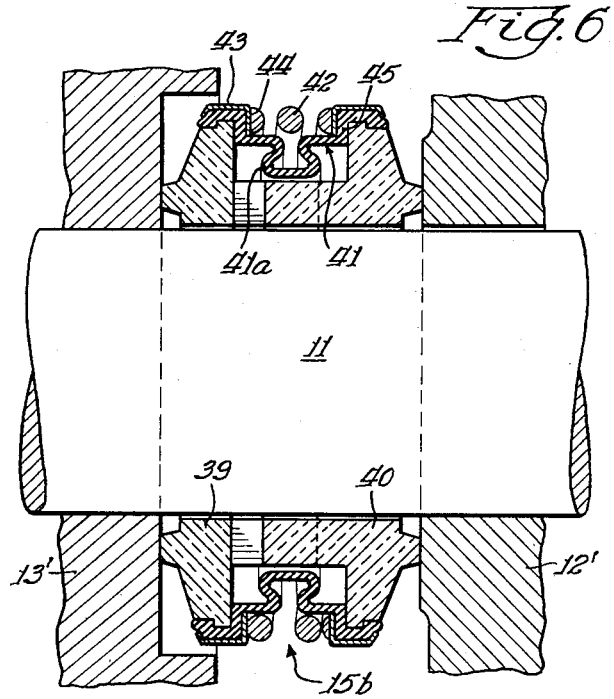
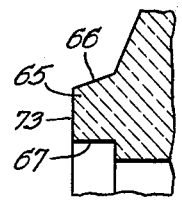
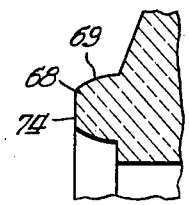
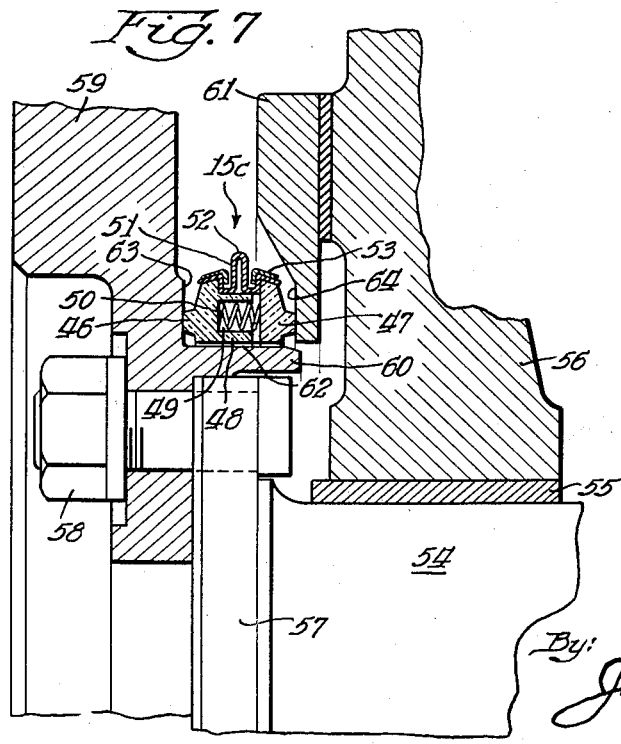
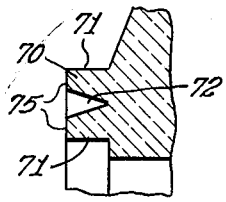
Inventor: Olin Brummer
By: Jones, Dalbo & Robertson
Attys.

United States Patent Office 2,912,265
Patented Nov. 10, 1959

2,912,265

FREE FLOATING DOUBLE END ANNULAR SEAL

Olin Brummer, Chicago Heights, Ill.

Application January 23, 1957, Serial No. 635,793

14 Claims. (Cl. 286—11.14)

This invention relates to free-floating double-end annular seal.

In the art of annular seals it has generally been considered necessary to have the seal tight with a rotating shaft or tight with an annular member in which the shaft rotates. Frequently the seal has made a tight engagement with the shaft directly and at other times with a member fixed to rotate with the shaft. At other times the seal has been made tight with a bearing member in which the shaft rotates, the other end of the seal making a rotative sealing engagement with the shaft or a member rotating with the shaft. In all of these prior practices, one end of the seal has generally been held rigid with respect to one of a pair of relatively rotatable members, with the result that the seal parts have been subjected to shocks and stresses in the operation of the relatively rotatable members which has frequently caused breakage of a seal part and consequent failure of the seal to fulfill its purpose of preventing passage of a fluid, which may be water, oil, dust laden air, or some such similar substance, from one place to another where it is not desired. This has been especially troublesome in the operation of large size annular seals such as in tractors, diesel engines and the like. Even where there have been attempts at making free floating double end seals, such seals have not heretofore been successful because of high cost and incapacity for centering or for compensating for wear on the respective ends.

An important object of the present invention is the provision of a unitary free floating double-end seal device having end members formed of a low cost moldable non-metallic material, the end members, which serve the function both of a body member and a sealing washer carrying means for interdigitation and being identical so that "lefts" and "rights" are not required, the material of said end members being such that it has sufficient strength so that one member may be a driving or torque member with respect to the other, while at the same time the annular end surfaces of the end members may be ground or lapped to provide the relatively rotatable annular sealing surface against a lapped annular surface of a compatible material such as cast iron for example.

A further object is the provision of a seal of the type with simplified and improved means for centering the seal and for equalizing wear on the sealing faces at each end.

The sealing device of the present invention is particularly adapted for automobile engine water pumps, rear main bearings, tractor hubs, diesel pumps and other heavy duty sealing installations.

The foregoing and other objects and advantages will be apparent by reference to the accompanying drawings showing illustrative embodiments of the invention, and in which drawings—

Figure 1 is an axial sectional view showing the invention applied to a pair of relatively rotatable members;

Figure 2 is a perspective view of a pair of the novel end members in interdigitated relationship;

Figure 3 is an end view on a reduced scale of one of the end members;

Figure 4 is a view on the scale of Fig 1 showing a modified form embodying slightly different resilient means between the end members;

Figure 5 is a view similar to Fig. 3 of an end member of Fig. 4;

Figure 6 is another view similar to Fig. 1 but showing a spring on the outside of the elastomeric sleeve.

Figure 7 is a quarter sectional view showing adaptation of the present sealing device to a rear main bearing; and Figures 8, 9 and 10 show modified forms of sealing noses for the end members.

Referring in detail to the illustrative construction shown in the drawings, the numeral 11 indicates any rotatable shaft which is arranged to rotate in a bearing member such as 12. On the shaft 11 is fixed, as by a force fit, the member 13, which in one instance, may be the hub of an impeller 14 of a water pump, say, for an automobile engine or the like. Between the bearing member 12 and the impeller hub 13 and circling the shaft 11, is the seal device 15 of the present invention.

In accordance herewith, the seal device 15 comprises a pair of end members 16 and 17 which are identical and which are thus interchangeable one for the other. Each end member provides a unitary body element and sealing washer in one piece. Since in common practice the bearing member 12 and impeller hub 13 are made of cast iron, the end members 16 and 17 are, following the present invention, made of a material which is compatible for the purpose with cast iron, or, in other words, which has a low coefficient of friction with respect to cast iron. In one preferred form of the invention, the end members 16 and 17 are made of, say, a molded phenolic condensation composition containing graphite, fibrous asbestos and metal alloys, so as to have sufficient strength to transmit torque from one end member to the other while at the same time being inexpensive and capable of production in large quantities by molding under the influence of heat and pressure without requiring any further working other than grinding of the sealing face. A single mold can advantageously make both member 16 and member 17. Other thermosetting plastic may be suitable.

On its outer face, end member 16 has an annular extension or nose 18 of relatively restricted area the forward face 19 of which is suitably ground or lapped to provide a smooth rotative annular sealing surface for abutment with the surface 20 of impeller hub 13, the surfaces 19 and 20 being perpendicular to the shaft 11. Similarly, the end member 17 has on its outer face an annular nose 21 having the perpendicular face 22 that provides a rotative sealing surface against the perpendicular face 23 of the bearing member 12.

As shown in the drawings the sealing noses 18 and 21 are of progressively reduced cross-section for a purpose later explained. In Fig. 1 the reduction of cross-section is in the form of a uniform taper A on the nose.

Further following the present invention, each of the end members 16 and 17 on its inner face carries an annular series of spaced apart axially extending segmental arcuate lugs or fingers 24, these fingers being advantageously of uniform arcuate dimension and being spaced apart a distance equal to said arcuate dimension. In this instance, there are four such fingers on each end member. So constructed and arranged the end members by their fingers 24 may be interdigitated, without telescoping, the fingers 24 jointly providing a substantially continuous cylindrical element that encircles the shaft 11 but that is desirably slightly spaced from the shaft, just as are also the end members 16 and 17. The common bore of the sealing device 15 thus provided is desirably of uniform diameter and of say between 0.006 and .020 inch larger than the diameter of the shaft 11. Torque is transmitted between the fingers 24 so that either end member may rotatively drive the other.

Further connecting the end members 16 and 17 at their peripheries is the flexible sleeve 26 of imperforate elastomeric material such as natural or synthetic rubber resistant to deterioration from heat, cold, moisture, chemicals, oil and other deleterious influences and distortable to provide for expansion and contraction of the seal device 15 by axial movement toward and away from each other of the end members 16 and 17, within the limits of continuous overlap of the fingers 24 thereof.

The peripheral edges of the end members 16 and 17 are desirably relieved as at 27 so that the annular terminal lip 28 of the elastomeric sleeve 26 is pressed into the relief area 27 to lock the sleeve to the end members respectively and this locking engagement is further secured by a metallic retainer ring 29, the outer edge 30 of which is desirably spun over the end member periphery to retain the lip 28 in the relief area 27. The elastomeric sleeve 26 advantageously has a corrugation 26' therein intermediately thereof to facilitate the contraction and expansion thereof.

Between the end members 16 and 17 is disposed resilient means urging the end members apart within the limits of the overlap of the fingers 24, i.e., so that at all times some overlap is present.

In the form shown in Fig. 1, the unitary compression helical coil spring 31 is located about the end member fingers 24 within the confines of and on the interior of the elastomeric sleeve 26.

The seal device 15 thus prevents water which may be in the pump chamber 32 from entering the bearing opening 33 for the shaft and thus prevents loss of water on that account as well as damage to other equipment.

The seal device 15, being free to rotate not only with respect to the shaft 11, but also with respect to either or both of the bearing members 12 and a shoulder on the shaft represented by the impeller hub 13, as on its surfaces 19 and 22, is both free floating and double ended and is thus torqueless in the sense that it sustains no predetermined torque force sufficient to put a strain on the lugs or fingers 24 and heat of friction is materially minimized, thus contributing to longer life and more efficient service of the seal device. Because the seal is free floating, it may at times rotate with the impeller 13 in which case there would be no rotative movement on the face 19 of the end member 16, but the sealing function would be continued to be effected thereat and rotative movement would occur on the other end face 22 of the seal with respect to the bearing member 12. Such rotation might be at less speed than the speed of shaft 11. On the other hand the seal may remain stationary with the bearing member 12, in which case there would be no rotative movement on the face 22 of the seal, but nevertheless the sealing function would be maintained thereat and rotative movement would occur on the other end face 19 of the seal, against the impeller hub 13.

By reason of the progressive reduction in cross-section of the noses 18 and 21 as for example by the taper A, if more wear occurs say on nose 21 due to the seal device rotating with the shaft, either at the same or slower speed, the cross-sectional surface of the nose 21 at 22 which bears against the surface 23 will become greater. This will produce more friction, and if and when that friction becomes greater than the friction between the nose 18 and the surface 20, the seal device 15 will stop rotating with the shaft or will reduce its speed of rotation with respect to the shaft. This will produce more friction between the nose 18 and the surface 20 which in turn will wear back the nose 18 until a larger cross-sectional area of contact develops between the surfaces 19 and 20 that compensates for the greater cross-sectional area 22 and thus equalizes the torque forces on the seal device so that both ends over a period of time wear equally to prolong the life of the seal.

Furthermore, by reason of the free floating character of the device, it is not subject to predetermined or external torque forces, which it avoids by slippage, and the end members are amply strong to sustain the slight torque force created by the frictional contacts previously referred to. Twisting of the end members relatively to each other is also resisted by the sleeve 26 and the spring 31. Any slight wobble which may occur relatively to the shaft 12 may be minimized by reducing the clearance on the shaft, but in any event is not destructive of the sealing function of the device, by reason of the slight clearance here indicated.

As shown in Fig. 4 a seal device 15a is similar to that shown in Fig. 1 except that the resilient means for urging expansion of the seal device to maintain the rotative sealing abutment at the faces of its end noses is incorporated in a plurality of relatively small individual expansion helical coil springs 34 that are carried in pockets 35 formed axially in the fingers 36 that are formed integrally with the end members 37 and 38 corresponding otherwise to the end members 16 and 17. In such embodiment, there may be four of the individual coil springs 34 spaced uniformly apart in the pockets in the fingers of one of the end members, bearing against the inner face of the other end member between its fingers and leaving the pockets in the fingers of said other end member empty of springs, or, if desired, all eight of the pockets may have springs therein. The individual springs may be preferred as they contribute to a greater balance and uniformity of pressure at the rotative sealing surfaces.

In the form 15b of the device shown in Fig. 6 the end members 39 and 40 are similar to the end members 16 and 17 but the elastomeric flexible sleeve 41 is different in that it has an internal corrugation at 41a in place of the external corrugation 26' of the sleeve 26. This permits the unitary helical coil spring 42 to be placed on the exterior of the sleeve 41, while still within the axial confines thereof. To assist in chucking the spring, in this instance, the retaining clips 43 for the sleeve have perpendicular flanges 44 against which the end coils of the spring 42 seat respectively, the sleeve 41 having shoulders 45 that are received between the end members and the clip flanges 44. Here again 12' is a bearing member in which shaft 11 turns while member 13' is rigid with the shaft and the device 15b can rotate relatively to shaft 11 and/or relatively to either 12' or 13' or both.

Figure 7 shows an adaptation of the invention to a rear main bearing of an automobile engine to prevent leakage of oil from the crank shaft out between the fly wheel and the engine block. Here the sealing device 15c is generally similar to the device 15a of Fig. 4 but the end members 46 and 47 have larger interdigitated lugs 48 recessed as at 49 for the reception of somewhat larger individual coil springs 50. The imperforate elastomeric sleeve 51 has the annular corrugation 52 therein and is clamped to the peripheries of the end members by retainer rings 53.

In the latter type of installation the crank shaft 54 turns in a bearing 55 through engine block 56 and has exteriorly of the block an integral flange 57 to which is bolted as at 58 a fly wheel 59 having an axially extending annular boss 60 that extends toward the engine block. The block in turn carries an annular plate 61 in the vicinity of the boss 60. The free floating double end seal 15c is disposed to encircle the boss 60 with a minimum of clearance at 62 on the boss and having rotative annular sealing engagement with the opposed faces 63 of the fly wheel and 64 of the plate and rotatable relatively to either or both faces.

Various forms of cross-sections of annular noses for the seal devices within the contemplation of the invention embodying provision for progressive cross-sectional enlargements following wear due to friction are illustrated in Figs. 8, 9 and 10. In Fig. 8, the nose 65 is tapered on one side as at 66 and is straight on the other side 67. In Fig. 9 the nose 68 is bulbous as at 69. In Fig. 10 the nose 70 is straight as at 71 on both sides but has an annular V-groove 72 therein. In each case, as the annular faces 73, 74 and 75 respectively wear, they become larger in area and thus increase the friction for the purpose described. The noses 65, 68 and 70 correspond otherwise to the nose 18 for example.

In each case, as clearly shown in the drawings, a cylindrical bearing surface, of uniform internal diameter, for the shaft or the like, is provided by the end members such as 16 and 17 and the interdigitated arcuate fingers 24, such bearing surface serving to center the seal device such as 15 on the shaft, when, for example the shaft and seal device have relative rotation, the fingers in each case spacing apart the shaft and the resilient means such as spring 31.

The invention is not intended to be limited to details of construction shown in accordance with the statutes for purposes of exemplification and such changes, including modifications and additions, may be made as fall within the scope of the appended claims without departing from the invention.

What is here claimed is:

1. A unitary free floating double end annular seal for encirclement of a shaft or the like while free of the shaft and free to rotate relatively thereto, comprising, a pair of end members having mutually interengaging torque elements therebetween for causing the end members to rotate together as a unit, an imperforate elastomeric distortable sleeve engaging both end members, and spring means urging the end members apart within the limits of interengagement of said torque elements, each end member having an annular nose extension of progressively reduced cross-section for rotative sealing engagement with each of a pair of relatively rotatable elements respectively, one of which is keyed to rotate with the shaft.

2. The structure of claim 1 wherein the mutually interengaging torque elements jointly form a continuous cylinder.

3. The structure of claim 2 wherein the torque elements are non-telescopically interdigitated whereby the end members may be identical.

4. The structure of claim 3 wherein the torque elements are in the form of integral axially extending annularly arranged interdigitated finger portions on the end members.

5. The structure of claim 1 wherein the spring means is inside the sleeve, and between the fingers and the sleeve.

6. The structure of claim 1 wherein the spring means is outside the sleeve.

7. The structure of claim 1 wherein the spring means is a single coil spring.

8. The structure of claim 1 wherein the spring means comprises a plurality of relatively small individual coil springs and the end members include pockets for locating said individual coil springs.

9. The structure of claim 8 wherein said pockets are in the fingers.

10. The structure of claim 1 wherein the nose has an annular V-shaped groove therein.

11. The structure of claim 1 wherein the nose is bulbous.

12. A unitary seal device of the class described for effecting a fluid seal between a rotary shaft and a bearing member therefor and compressed between said bearing member and a shoulder rotating with the shaft, comprising, a pair of annular end members having rotative sealing abutments with said bearing member and shoulder respectively, said end members having respectively integral axially extending angularly spaced apart fingers interdigitated to provide relative axial movement of one end member with respect to the other end member while effecting common rotative movement, said fingers having internal arcuate surfaces of uniform radius whereby to effect a jointly cylindrical surface providing a cylindrical bearing for the shaft, spring means compressed between said end members and spaced from the shaft by said fingers, an elastomer sleeve having margins overlying the end members peripheries respectively and enclosing said spring means, and retainer rings clamping the sleeve to the end members.

13. In a unitary seal device of the class described for effecting a fluid seal between a rotary shaft and a bearing member therefor and compressed between said bearing member and a shoulder rotating with the shaft, a pair of annular end members having rotative sealing abutment with said bearing member and shoulder respectively, said end members having axially extending angularly spaced apart fingers interdigitated to provide relative axial movement of one end member with respect to the other end member while effecting common rotative movement, said end members and said fingers having internal arcuate surfaces of uniform radius, whereby to provide a jointly cylindrical bearing surface for the shaft, and spring means compressed between said end members and spaced from the shaft by said fingers.

14. In a double-end annular seal device, a pair of annular identical non-metallic end members, said members carrying non-telescoping mutually interdigitated finger portions jointly providing a cylindrical formation of uniform external diameter and uniform internal diameter, said external diameter being substantially less than the outer diameter of the end members, a continuous compressible and extensible sleeve member connecting said end members by overlapping interlocking engagement with the peripheries of the end members respectively, and spring means interposed between the end members.

References Cited in the file of this patent

UNITED STATES PATENTS

| | | |
|---|---|---|
| 1,544,609 | Somes | July 7, 1925 |
| 1,956,336 | Vedovell | Apr. 24, 1934 |
| 2,277,771 | McNab | Mar. 31, 1942 |
| 2,287,207 | Vedovell | June 23, 1947 |
| 2,586,739 | Summers | Feb. 19, 1952 |
| 2,851,291 | Payne | Sept. 9, 1958 |